United States Patent
Johansson et al.

(10) Patent No.: US 10,126,854 B2
(45) Date of Patent: Nov. 13, 2018

(54) PROVIDING TOUCH POSITION INFORMATION

(71) Applicant: Sony Corporation, Tokyo (JP)

(72) Inventors: Magnus Johansson, Dosjebro (SE); Magnus Midholt, Lund (SE); Andreas Sandblad, Lund (SE); Markus Andreasson, Lund (SE); Ola Thorn, Limhamn (SE); Olivier Moliner, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 216 days.

(21) Appl. No.: 14/640,779

(22) Filed: Mar. 6, 2015

(65) Prior Publication Data
US 2016/0259458 A1  Sep. 8, 2016

(51) Int. Cl.
*G06F 3/041* (2006.01)
*G06F 3/044* (2006.01)
*G06F 3/0487* (2013.01)

(52) U.S. Cl.
CPC ............ *G06F 3/0414* (2013.01); *G06F 3/044* (2013.01); *G06F 3/0418* (2013.01); *G06F 2203/04104* (2013.01); *G06F 2203/04105* (2013.01); *G06F 2203/04106* (2013.01)

(58) Field of Classification Search
CPC .................. G06F 3/0414; G06F 3/044; G06F 2203/04105; G06F 2203/04106; G06F 3/04886; G06F 3/0416; G06F 3/0412; G06F 3/041; G06F 3/048; G06F 3/0481; G06F 3/14; G06F 3/0418; G09G 5/00; G09G 2300/026; G09G 2300/02; G09G 2300/00
See application file for complete search history.

(56) References Cited

U.S. PATENT DOCUMENTS 8,319,739 B2 * 11/2012 Chu .................. G06F 3/0418
345/173
8,890,823 B2 * 11/2014 Alameh ............... G06F 3/038
345/169
9,158,426 B1 * 10/2015 Woodhull ............ G06F 3/0418
(Continued)

FOREIGN PATENT DOCUMENTS

EP  2 463 798  6/2012

OTHER PUBLICATIONS

ModernBob, Technet (https://social.technet.microsoft.com/Forums/windowsserver/en-US/4ad06e11-2ac1-4480-ace8-833a0b1cbe98/windows-7-sleep-timeout-not-working-as-expected?forum=w7itprogeneral), Apr. 2010.*
(Continued)

*Primary Examiner* — Julie Anne Watko
(74) *Attorney, Agent, or Firm* — Renner Otto Boisselle and Sklar

(57) ABSTRACT

A device may determine touch position information representing a position where a touch surface is touched by an object, and may determine force information representing a force being applied by the object to the touch surface. Based on the force information, the device may determine that the force applied to the touch surface does not satisfy a force threshold. Afterwards, the device may determine that a particular duration has not elapsed. Finally, after determining that the particular duration has not elapsed, the device may provide the touch position information for further processing.

20 Claims, 3 Drawing Sheets

(56) References Cited

U.S. PATENT DOCUMENTS

| | | | |
|---|---|---|---|
| 9,235,340 B2* | 1/2016 | Honji | G06F 3/0414 |
| 9,489,097 B2* | 11/2016 | Johansson | G06F 3/0412 |
| 9,678,590 B2* | 6/2017 | Nakayama | G06F 3/0414 |
| 2006/0132455 A1* | 6/2006 | Rimas-Ribikauskas | G06F 3/0414; 345/173 |
| 2009/0256817 A1* | 10/2009 | Perlin | G06F 3/0233; 345/174 |
| 2010/0053116 A1* | 3/2010 | Daverman | G06F 3/0414; 345/175 |
| 2010/0128002 A1* | 5/2010 | Stacy | G06F 3/016; 345/174 |
| 2011/0285645 A1* | 11/2011 | Cho | G06F 3/0416; 345/173 |
| 2012/0188194 A1* | 7/2012 | Sulem | G06F 3/041; 345/174 |
| 2012/0212421 A1* | 8/2012 | Honji | G06F 3/0414; 345/173 |
| 2013/0061176 A1* | 3/2013 | Takehiro | G06F 3/0488; 715/823 |
| 2013/0222338 A1* | 8/2013 | Gim | G06F 3/041; 345/174 |
| 2013/0321334 A1* | 12/2013 | Yoshida | G06F 3/0416; 345/174 |
| 2014/0028575 A1* | 1/2014 | Parivar | G06F 3/0414; 345/173 |
| 2014/0078073 A1* | 3/2014 | Gan | G06F 1/169; 345/173 |
| 2014/0145993 A1* | 5/2014 | Nakayama | G06F 3/0414; 345/173 |
| 2014/0253305 A1* | 9/2014 | Rosenberg | G06F 3/016; 340/407.2 |
| 2014/0368455 A1* | 12/2014 | Croisonnier | G06F 3/0414; 345/173 |
| 2015/0242045 A1* | 8/2015 | Choi | G06F 3/0416; 345/173 |
| 2015/0268768 A1* | 9/2015 | Woodhull | G06F 3/0418; 345/168 |
| 2015/0301613 A1* | 10/2015 | Yanev | G06F 3/0202; 463/31 |
| 2015/0370387 A1* | 12/2015 | Yamaguchi | G06F 3/047; 345/174 |
| 2016/0259544 A1* | 9/2016 | Polikarpov | G06F 3/04886 |
| 2016/0328065 A1* | 11/2016 | Johnson | G06F 3/03545 |
| 2017/0153760 A1* | 6/2017 | Chawda | G06F 3/0418 |

OTHER PUBLICATIONS

International Search Report and Written Opinion corresponding to PCT/EP2015/069653, dated Nov. 19, 2015, 12 pages.

* cited by examiner

PROVIDING TOUCH POSITION INFORMATION

FIELD OF THE INVENTION

The present invention relates to a touch screen device, especially to a touch screen device comprising a position sensor as well as a force sensor which may be used in a handheld device, for example a so-called smartphone. The present invention relates furthermore to a handheld device comprising the touch screen device and a method for operating the touch screen device.

BACKGROUND OF THE INVENTION

Especially in the area of mobile handheld devices, for example mobile navigation devices, mobile personal digital assistants and mobile phones, especially so-called smartphones, there is a need and design trend to larger displays. The displays of these devices are usually provided with a touch-sensitive surface for detecting a user touching a surface of the display for operating the device. On the other hand, the overall size of the devices is required to be small enough to be held comfortable within one hand and to be stowed in a pocket or in a small handbag. Therefore, the bezels around the displays of mobile devices are getting smaller or they are completely omitted. Thus, the whole front surface of for example a mobile phone is covered by the display or touch screen. FIG. 1 shows such a mobile handheld device 10 having a touch screen 11 covering the whole front surface of the mobile handheld device 10. FIG. 1 furthermore demonstrates one of the challenges of such a design. The fingers of the hand holding the mobile phone 10 may touch the touch-sensitive surface 11 and this may be detected by a capacitive touch sensor and may cause usability problems. In the example shown in FIG. 1, the mobile handheld device 10 is held between fingers 40 to 42 on the left-hand side and the thumb and a part of the hand palm 43 on the right-hand side. However, due to holding the device 10, in the example shown in FIG. 1, the fingertips of fingers 41 and 42 are touching the touch screen 11 in areas 31 and 32, respectively, and a part of the hand palm 43 touches the touch screen 11 in area 33.

Therefore, there is a need to differentiate the fingers holding the mobile handheld device from the ones actually interacting with a user interface of the mobile device.

SUMMARY OF THE INVENTION

According to an embodiment of the present invention, a touch screen device is provided. The touch screen device comprises a position sensor unit configured to determine a touch position information representing a position where a touch surface of the touch screen device is touched by an object. The position sensor unit may comprise for example a capacitive sensor unit arranged in connection with the touch surface and configured to determine a change of capacitance when an object, for example a finger of a user, is approaching or touching the touch surface. The capacitive sensor may comprise a plurality of sensor units arranged such that a position where the touch surface is touched by the object may be determined. The touch screen device comprises furthermore a force sensor unit configured to determine a force information representing a force being applied by the object to the touch surface of the touch screen device. The force sensor unit may comprise for example a plurality of strain gauges arranged at the touch surface or pressure sensors arranged between the touch surface and a support of the touch surface. The force sensor unit may be configured to determine a force which is applied by the object in a direction perpendicular to the touch surface. The touch screen device comprises furthermore a processing unit which is configured to receive the force information from the force sensor unit and to determine if the force applied to the touch surface exceeds a predefined force threshold. Furthermore, the processing unit is configured to output the touch position information from the position sensor unit and/or the force information from the force sensor unit for further processing if the force exceeds the predefined force threshold. In other words, the processing unit monitors the force information provided by the force sensor unit and forwards the touch position information for further processing only if the force exceeds a predefined force threshold. The "further processing" may comprise for example a processing of the touch position information by an application of a mobile handheld device in which the touch screen device is arranged. Thus, false touch events are suppressed by use of the force sensor unit, which may be arranged under the touch screen device. False touch events forced by the fingers holding the touch screen device mostly result from the skin of the fingers bending around an edge of the touch screen device and exciting the position sensor unit, for example a capacitive touch sensor. In normal use, the fingers holding the touch screen device do not apply a force to the touch surface, but to rear and side surfaces of the touch screen device. Furthermore, in normal use, the fingers operating the touch screen device usually apply forces to the touch surfaces and these forces may be measured with the force sensor unit. Therefore, touch events are only allowed to be processed if the corresponding force is above give threshold. Thus, a further processing of false touch events may be avoided.

The force sensor unit is not restricted to a particular embodiment as long as it is configured to provide a force information that represents the force applied to the touch surface. According to another embodiment, the force sensor unit may also comprise a piezoelectric element, an accelerometer element, a strain gauge element etc. or combinations thereof.

According to an embodiment, the touch surface has a circumferential edge. The processing unit is configured to output the touch position information and/or the force information to the further processing if the touch position information indicates a position within a predefined distance to the edge and if the force exceeds the predefined force threshold. Furthermore, the processing unit is configured to output the touch position information and/or the force information to the further processing if the touch position information indicates a position outside the predefined distance to the edge irrespective of whether the force exceeds the predefined threshold. As the problem with the false touch events mainly occurs around the borders or edges of the touch screen device, the force information may be considered only the edge area or border area of the touch surface. The predefined distance defining the width of the border area or edge area may be in a range of 2 to 10 mm preferably in a range of 4 to 7 mm and may have preferably a value of 5 mm. Therefore, in the edge area or border area a touch event must exceed the predefined force threshold to be forwarded to further processing, whereas in the remaining area of the touch surface any touch event is forwarded to further processing regardless of the force applied.

According to another embodiment, the processing unit comprises a timer which is started by the processing unit upon detecting a touch of the touch screen device based on the touch position information. After the timer has been started, the processing unit queues subsequent touch position information and force information detected by the position sensor unit and the force sensor unit. The subsequent touch position information and force information is queued until at least one of the following conditions is fulfilled. If the force exceeds the predefined force threshold, the queued touch position information and force information is output to the further processing. If the timer exceeds a predefined duration, the queued touch information and force information are discarded. The finger tip of a user touching the touch surface may be elastic. Therefore, it may take a few milliseconds after the touch down event for the force to reach its final value. In order to avoid rejecting true touch events because of this delay, events will not be rejected until a given delay or duration after the touch down event has been reached.

After the queued touch position information and force information has been discarded due to the timer exceeding the predefined duration, the processing unit may discard subsequent touch position information and force information relating to the touch upon which the timer was started. In other words, all subsequent events relating to that finger touch will also be rejected, even if more pressure is applied, until the finger leaves the touch screen device. Therefore, false touch events resulting from intermediate force increase may be reliably detected and discarded.

Furthermore, after the queued touch position information and force information has been output due to the force exceeding the predefined force threshold, the processing unit may be configured to output subsequent touch position information and force information relating to the touch upon which the timer was started irrespective of whether the force exceed the predefined threshold. Therefore, once a touch event has been identified as a true touch event, subsequent touch position information, resulting for example from the finger moving along the touch surface, are also identified as true touch events irrespective of the force applied during these subsequent touch events.

The predefined duration the timer has to exceed before the queued touch position information and force information are discarded is preferably in a range of 10 to 200 milliseconds, more preferably in a range of 16 to 50 milliseconds. Thus, a user gets enough time to build up sufficient force to identify a touch event as a true touch event, and on the other hand this duration is short enough to avoid long lags, as a refresh rate of an image on the touch screen device may have a corresponding frequency of 20 to 60 Hz.

According to an embodiment, the predefined force threshold is calculated based on the touch position. For example, the predefined force threshold may be a function of a distance between the actual touch position and an edge of the touch surface of the touch screen device. Therefore, in an edge area a higher force has to be applied to validate a touch event, whereas in a center of the touch surface of the touch screen device a lower touch force or even no touch force is required to validate a touch event.

According to an embodiment, the predefined force threshold may have a value in a range of 0.01 to 0.1 N, preferably a value in a range of 0.03 to 0.07 N, or may have a value of 0.05 N. For example, the predefined force threshold may have a value which corresponds to the sensitivity limit of the used force sensor unit.

According to another embodiment, the position sensor unit comprises a capacitive sensor unit which is configured to determine the touch position information based on a change in capacitance at the position where the touch surface is touched by the object. For example, the position sensor unit may provide a two-dimensional position information concerning the touch position. Additionally or as an alternative, the force sensor unit may comprise the position sensor unit and may be configured to determine the touch position information representing the touch position where the touch surface of the touch screen device is touched by the object based on the force being applied by the object to the touch surface of the touch screen device. The force sensor unit may have a two-dimensional resolution providing a two-dimensional touch position information based on the position where a force is applied to the touch surface.

According to another embodiment, a handheld device is provided which comprises a housing and a touch screen device. A touch surface of the touch screen device constitutes at least a part of at least one surface of the housing. At least a part of an edge of the touch surface coincides with a part of an edge of the housing. For example, the housing may have a cubic form and the touch screen device constitutes one complete surface area of the cubic form. The touch screen device may comprise a display extending along the touch surface such that information may be displayed by the display all over the touch surface including edge areas where the touch surface contacts corresponding side surfaces of the cubic housing. The touch screen device comprises furthermore a position sensor unit configured to determine a touch position information representing a position where the touch surface of the touch screen device is touched by an object, and a force sensor unit configured to determine a force information representing a force being applied by the object to the touch surface of the touch screen device. The position sensor unit may be configured to determine the touch position information for touch positions all over the touch surface including edge areas where the touch surface is joined to side surfaces of the cubic housing. The touch screen device comprises furthermore a processing unit which is configured to determine based on the force information if the force applied to the touch surface exceeds a predefined force threshold. If the force exceeds the predefined force threshold, the processing unit outputs the touch position information and/or the force information for further processing to for example an application of the handheld device or an operating system of the handheld device.

The handheld device may comprise for example a mobile telephone, especially a so-called smartphone, a mobile computer, a personal digital assistant, a tablet computer, a mobile media player, a mobile navigation system, a smartwatch or other wearables. Furthermore, the invention may also be used in iOT ("internet of things") devices or networked home appliances, for example.

According to another embodiment of the present invention a method is provided which comprises the following steps. A touch position information representing a position where a touch surface of a touch screen device is touched by an object is determined with a position sensor unit. A force information representing a force being applied by the object to the touch surface of the touch screen device is determined with a force sensor unit. A processing unit, for example, a microprocessor, determines based on the force information if the force applied to the touch surface exceeds a predefined force threshold. If the force exceeds the predefined force threshold, the processing unit outputs the touch position information and/or the force information for further processing.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise. Same reference signs in the various drawings refer to similar or identical components.

Figure 1:
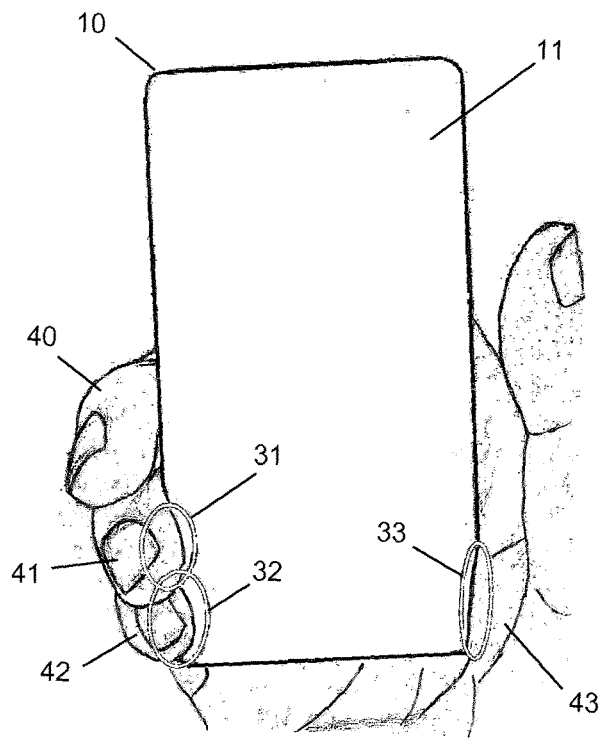
FIG. 1 shows schematically a hand of the user holding a handheld device.

FIG. 1 shows a handheld device 10, for example a mobile telephone, especially a so-called smartphone, with a touch screen device 11 covering the whole front surface of the handheld device 10. In other words, the touch screen device 11 is not surrounded by a bezel, but the edges of the touch screen device 11 coincide with the edges of the housing of the handheld device 10 such that the whole front surface of the handheld device 10 may be used to display information to a user and to receive operation commands from the user by touching the surface of the touch screen device 11.

However, as can be seen from FIG. 1, the user may accidentally or unintentionally touch the surface of the touch screen device 11 with fingers 41, 42 or the hand palm 43 in areas indicated in FIG. 1 by reference signs 31 to 33. Touch events in the exemplary areas 31 to 33 based on unintentional touches when the user is holding the handheld device 10 will be called in the following false touch events. Intentional touches by the user for operating applications and functions of the handheld device 10 will be called in the following true touch events.

Figure 2:
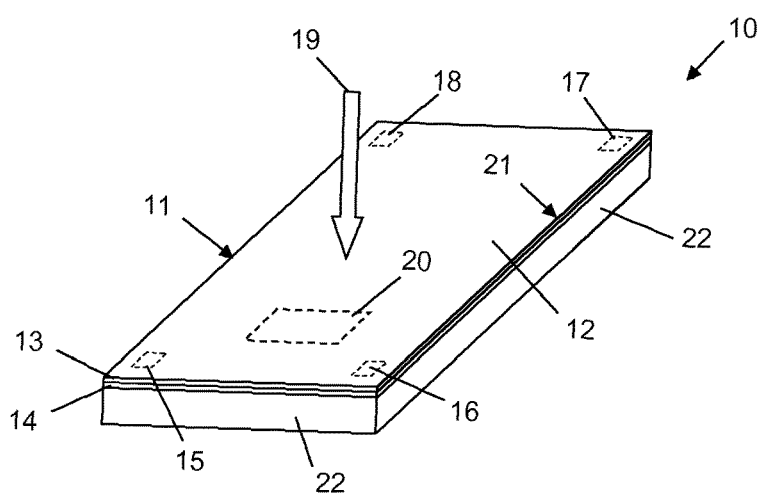
FIG. 2 shows schematically a perspective view of a handheld device according to an embodiment of the present invention.

FIG. 2 shows schematically a perspective view of the handheld device 10 in more detail. An upper side or a front side of the handheld device 10 consists of the touch screen device 11. The touch screen device 11 comprises for example a touch surface 12, for example made of glass, and a display layer 13 comprising for example a liquid crystal display (LCD) for generating visual images on the touch surface 12. The touch screen device 11 may comprise furthermore a position sensor unit 14, for example a capacitive touch sensor layer configured to determine a touch position information representing a position where the touch surface 12 is touched by an object, for example by a finger of a user. The touch screen device 11 may comprise furthermore a force sensor unit comprising for example a plurality of force sensors 15 to 18 arranged below the position sensor unit 14 and configured to determine a force information representing a force 19 being applied by the object to the touch surface 12. The force sensor unit 15-18 may be especially configured to determine a force 19 which is applied essentially perpendicular to the touch surface 12. Furthermore, the force sensor unit 15 to 18 may be configured to additionally determine a position where the force 19 is applied to the touch surface 12. The touch screen device 11 may comprise additionally a processing unit 20, for example a microprocessor or a controller, coupled to the position sensor unit 14 and the force sensor unit 15 to 18. The processing unit 20 may additionally be coupled to the display layer 13 for driving the liquid crystals of the display layer 13. A circumferential edge 21 of the touch screen device 11 coincides or constitutes an edge of the handheld device 10 such that the edge 21 joins the touch surface 12 and side surfaces 22 of the handheld device 10. As there is no bezel surrounding the touch surface 12, a large usable area of the touch screen device 11 can be provided to the user covering the whole front surface of the handheld device 10 for displaying data to the user and for receiving touch information from the user for operating applications and functions of the handheld device 10. However, false touch events caused by fingers of the user holding the handheld device 10 may occur as the skin of the fingers may bend around the edge 21 and excite the capacitive position sensor unit 14 as indicated in areas 31 to 33 in FIG. 1. In normal use the fingers holding the handheld device 10 do not apply forces on the touch surface 12, but apply forces to the backside and the side surfaces 22 of the handheld device 10. Therefore, forces applied to the touch surface 12 may be measured with the force sensor unit 15 to 18 and evaluated to distinguish false touch events from true touch events. For example, a true touch event may be determined only, if a force of a touch exceeds a certain force threshold. The force sensor unit 15 to 18 may detect how much force is applied on the touch surface 12 as well as where on the touch surface 12 the force is applied. The force sensor unit 15 to 18 may also support a multi-touch detection.

Figure 3:
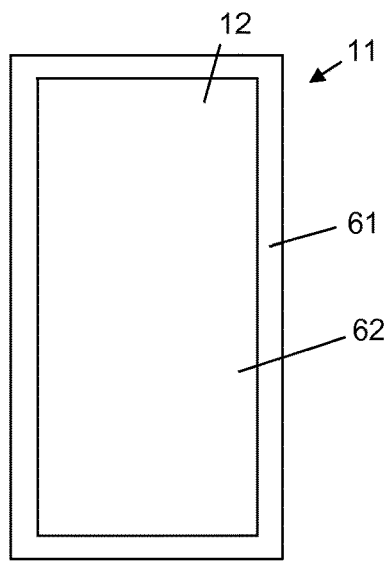
FIG. 3 shows a top view of a touch screen device according to an embodiment of the present invention.

Operation of the processing unit 20 for distinguishing true touch events from false touch events will be described in the following in connection with FIGS. 3 to 5.

False touch events only occur around the borders of the touch screen device 11. Therefore, different force thresholds may be used depending on where the touch event is detected on the touch screen device 11. For example, the touch screen device 11 may be divided into two areas as shown in FIG. 3: A border area 61 with a high force threshold (e.g. 0.5 N), and a center area 62 with a low force threshold, e.g. with a threshold equal to 0. The width of the border area 61 may be in the range of a few millimeters, for example in a range of 4 to 7 mm. When a touch is detected within the border area 51 with the capacitive position sensor unit 14, such a touch event will be only identified as a true touch event, if the force sensor unit 15 to 18 indicates that a force is applied to the touch surface 12 which is higher than the high force threshold. Touch events occurring in the center area 62 are identified as true touch events when they exceed the low force threshold or, in case the low force threshold is set to 0, independently from the force. Therefore, unintentional touch events occurring in the border area 61 may be reliably identified as false touch events. The processing unit 20 forwards only true touch events to applications running on the handheld device 10 such that unintentional touch events are ignored.

Figure 4:
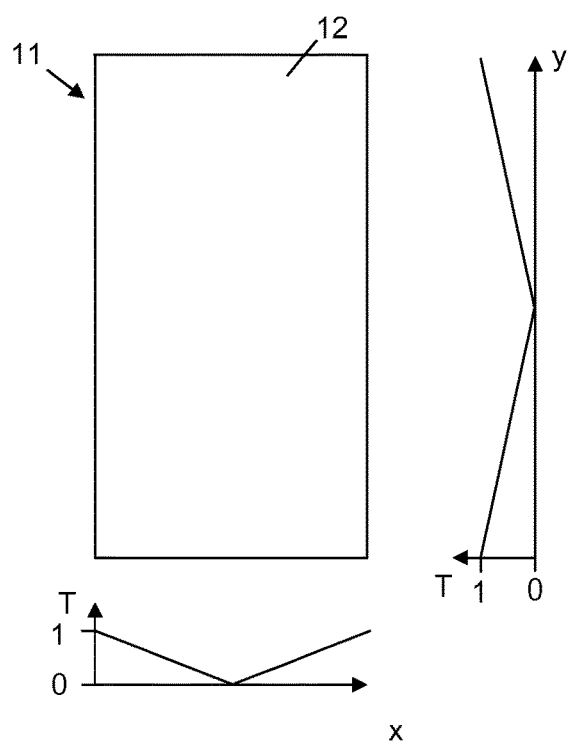
FIG. 4 shows a top view of a touch screen device according to another embodiment of the present invention.
Figure 5:
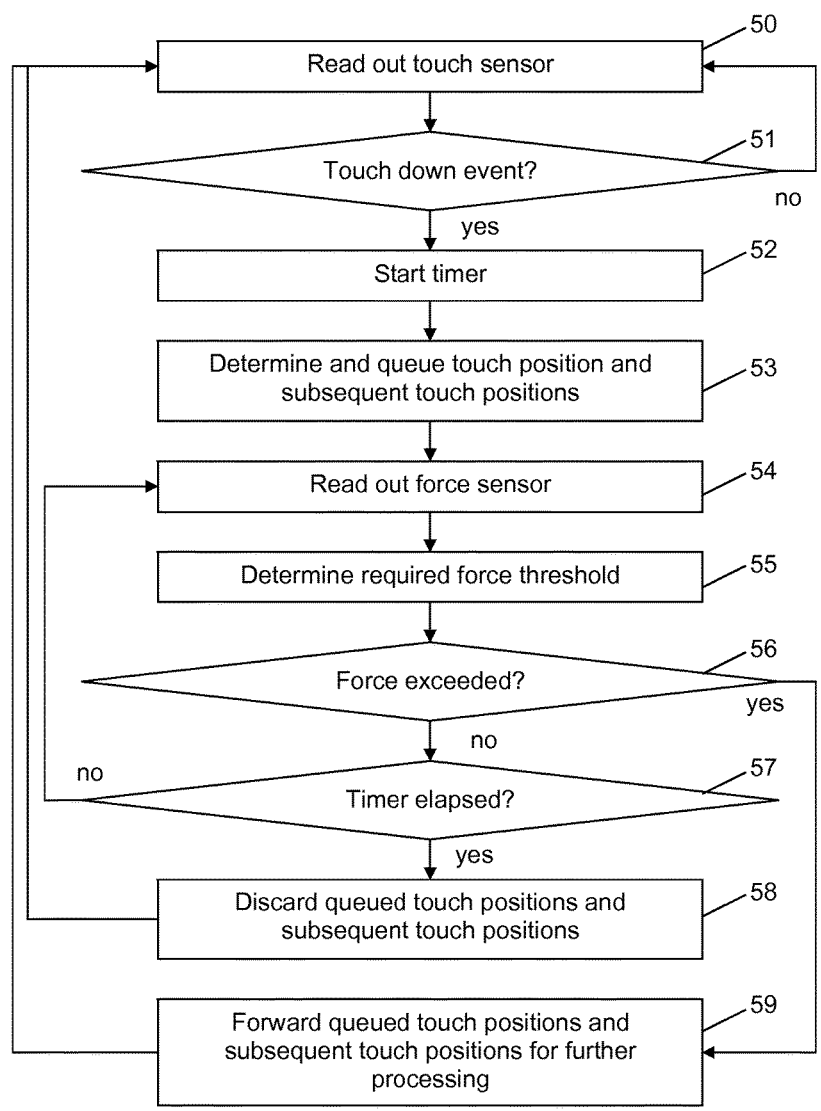
FIG. 5 shows a flowchart comprising method steps of a method for operating a touch screen device according to an embodiment of the present invention.

Additionally or as an alternative, the touch surface 12 of touch screen device 11 could be divided more finely into concentric areas having different force threshold values for identifying true touch events, or the force threshold may also be a continuous function of the distance to the border of the touch surface 12 as indicated for example in FIG. 4. The two-dimensional area of the touch surface 12 is indicated by axes x and y in FIG. 4. The diagrams arranged below and on the right-hand side of the touch screen device 11 indicate a relative threshold value T along the corresponding dimension. For example, in the x-direction, the force threshold starts at the edge of the touch surface 12 with a value of 1 and gradually decreases to the center in the x-direction to a value of 0. From the center to the right edge of the touch surface 12 the force threshold T gradually increases from 0 to 1. In the y-direction the force threshold also starts at the bottom with a value of 1 and gradually decreases to 0 at the center in the y-direction, and then gradually increases to a value of 1 at the upper side of the touch surface 12. However, any other function of the force threshold depending on the position on the touch surface 12 may be used, for example a stepped function or a parabolic function.

The tips of the fingers are elastic. Therefore, it may take a few milliseconds after a touch down for the force to reach its final value. In order to avoid rejecting true touch events because of this delay, touch events may be rejected only after a given delay after the touch down event. Corresponding method steps will be described in more detail in the following in connection with FIG. 5.

In step 50 the touch position information representing a position where the touch surface 12 of the touch screen device 11 is touched by an object is determined with the position sensor unit 14. In other words, the capacitive touch sensor of the touch screen device 11 is read out in step 50. In step 51 is determined, if a new touch down event on the touch surface 12 has occurred. In case no new event has occurred, the method is continued in step 50. Otherwise, in step 52 a timer is started. Furthermore, in step 53 a touch position of the new touch down event is determined and queued in a corresponding memory of the processing unit 20. Furthermore, subsequent touch position information relating to the touch down event is determined by the position sensor unit 14 and queued. In step 54 a force information representing a force being applied by the object to the touch surface 12 is determined with the force sensor unit 15 to 18, i.e., the force sensors 15 to 18 are read out. In step 55 a required force threshold for indicating a true touch event is determined for the touch position of the touch down event, for example as described above in connection with FIGS. 3 and 4. In step 56 the measured force is compared with the required force threshold, and, in case the required force threshold is exceeded, a true touch event is determined and the method is continued in step 59. In step 59 the queued touch position and subsequent touch positions are forwarded for further processing to applications of the handheld device 10. Furthermore, the method continues to monitor for the next touch down event in step 50. In case in step 56 is determined that the force threshold is not exceeded, the method is continued in step 57 wherein the processing unit 20 monitors the timer. In case a predefined duration of several milliseconds, for example 50 milliseconds is elapsed, the queued touch position and subsequent touch positions of this touch down event are discarded in step 58 and the method is continued in step 50. Otherwise, if the timer is not elapsed, the method is continued in step 54 for monitoring if the force threshold is exceeded within the predefined duration.

To sum up, when a touch down event is detected, the required force threshold is calculated from the coordinates of the touch event and the timer is started. The touch down event and all subsequent events relating to that touch down event are queued and the force sensor values corresponding to the touch down event are read until either of the following occurs:

the force exceeds the threshold: The touch down event becomes a confirmed or true touch event and all queued touch events are sent to the application as well as all subsequent events relating to that touch down event, even if the pressure decreases, until the touching object leaves the touch layer 12;

the timer expires: The touch event is rejected and all queued touch events are dropped. All subsequent touch events relating to that touch event will also be rejected, even if more pressure is applied, until the touching object leaves the touch layer 12.

The above-described method may add a few milliseconds latency to some touch events occurring near the edge of the touch screen device 11. If there is a need to avoid such lags, in an alternative implementation the touch events may be forwarded immediately to the application layer and the touch may be finally rejected as described above, and sending further touch events for this touch down event is stopped. However, in this case, spurious tap events near the edges may occur.

The force information used to distinguish true and false touch events may be sent additionally to the application for further processing in case of a true touch event. This may enable interesting use cases, for example a three-dimensional user interface. Furthermore, the force sensor unit may be configured to detect the touch position and to handle multi-touch such that the capacitive touch sensor may be replaced by the force sensor unit.

The invention claimed is:

1. A device, comprising:
   one or more units, at least partially implemented in hardware, to:
      determine force information representing a force being applied by an object to a touch surface;
      calculate a force threshold based on a touch position,
         the force threshold being based on a function that is based on a distance from a center of the touch surface, and
         the function being a parabolic function or a function that linearly relates the force threshold to the distance from the center of the touch surface;
      determine, based on the force information, that the force applied to the touch surface does not satisfy the force threshold;
      determine, after determining that the force applied to the touch surface does not satisfy the force threshold, that a particular duration has not elapsed;
      determine subsequent force information representing an increased force being applied by the object to the touch surface;
      calculate, after determining the subsequent force information, a subsequent force threshold based on a subsequent touch position and based on the function;
      determine, after determining that the particular duration has not elapsed and after calculating the subsequent force threshold, that the increased force satisfies the subsequent force threshold; and provide, after determining that the particular duration has not elapsed and after determining that the increased force satisfies the subsequent force threshold, touch position information for further processing.

2. The device of claim 1,
wherein the touch surface has a circumferential edge, and
wherein, when providing the touch position information, the one or more units, at least partially implemented in hardware, are to:
provide the touch position information for further processing if the subsequent touch position is within a predefined distance to the circumferential edge.

3. The device of claim 2, wherein the predefined distance comprises a value in a range of 2 to 10 mm.

4. The device of claim 1, wherein the one or more units, at least partially implemented in hardware, are to:
start a timer upon detecting a touch;
after the timer has been started, queue subsequent touch position information; and
if the timer exceeds the particular duration, discard the queued subsequent touch position information.

5. The device of claim 4, wherein the one or more units, at least partially implemented in hardware, are to:
after the queued subsequent touch position information has been discarded, discard other subsequent touch position information relating to the touch upon which the timer was started.

6. The device of claim 1, wherein the one or more units, at least partially implemented in hardware, are to:
after the touch position information has been provided, provide subsequent touch position information relating to a touch upon which a timer was started.

7. The device of claim 1, wherein the particular duration comprises a value in a range of 10 to 200 ms.

8. The device of claim 1, wherein the force threshold comprises a value in a range of 0.01 to 0.1 N.

9. The device of claim 1, wherein the one or more units, at least partially implemented in hardware, are further to:
determine the touch position information based on a change in capacitance at the touch position.

10. The device of claim 1, wherein the one or more units, at least partially implemented in hardware, are further to:
determine the touch position information based on the force being applied by the object to the touch surface.

11. A handheld device comprising:
a housing;
a touch screen, wherein a touch surface of the touch screen constitutes at least a part of at least one surface of the housing, and wherein at least a part of an edge of the touch surface coincides with a part of an edge of the housing; and
at least one or more units, at least partially implemented in hardware, to:
determine a first touch position where the touch surface of the touch screen is touched by an object;
determine first force information representing a first force being applied by the object to the touch surface of the touch screen;
calculate a first force threshold based on the first touch position,
the first force threshold being based on a function that is based on a distance from a center of the touch surface, and
the function being a parabolic function or a function that linearly relates the first force threshold to the distance from the center of the touch surface;
determine, based on the first force information, that the first force applied to the touch surface does not satisfy the first force threshold;
determine, after determining that the first force applied to the touch surface does not satisfy the first force threshold, that a particular duration has not elapsed;
determine second force information representing a second force being applied by the object to the touch surface;
calculate, after determining the second force information, a second force threshold based on a second touch position and based on the function;
determine, after determining that the particular duration has not elapsed and after calculating the second force threshold, that the second force satisfies the second force threshold; and
provide, after determining that the particular duration has not elapsed and after determining that the second force satisfies the second force threshold, touch position information for further processing.

12. The handheld device of claim 11, wherein the handheld device comprises at least one of a mobile telephone, a mobile computer, a personal digital assistant, a tablet computer, a mobile media player, or a mobile navigation system.

13. A method comprising:
determining, by a device, a force information representing a force being applied by an object to a touch surface;
calculating, by the device, a force threshold based on a touch position,
the force threshold being based on a function that is based on a distance from a center of the touch surface, and
the function being a parabolic function or a function that linearly relates the force threshold to the distance from the center of the touch surface;
determining, by the device and based on the force information, whether the force applied to the touch surface satisfies the force threshold;
determining, by the device, subsequent force information representing an increased force being applied by the object to the touch surface;
calculating, by the device and after determining the subsequent force information, a subsequent force threshold based on a subsequent touch position and based on the function;
determining, after determining the subsequent force information and after calculating the subsequent force threshold, that the increased force satisfies the subsequent force threshold; and
providing, by the device and after determining that the increased force satisfies the subsequent force threshold, touch position information for further processing.

14. The method of claim 13, wherein the subsequent force threshold is greater than the force threshold, based on the function, when the subsequent touch position is farther from the center of the touch surface than the touch position.

15. A device, comprising:
a memory; and
one or more processing units, at least partially implemented in hardware, to:
determine a touch position where a touch surface is touched by an object;
determine force information representing a force being applied by the object to the touch surface;
determine a force threshold based on the touch position and based on a function that is based on a distance from a center of the touch surface, the function being a parabolic function or a function that linearly relates the force threshold to the distance from the center of the touch surface;

determine, based on the force information, that the force applied to the touch does not satisfy the force threshold;

determine, after determining that the force applied to the touch surface does not satisfy the force threshold, subsequent force information representing an increased force being applied by the object to the touch surface;

determine, after determining the subsequent force information, a subsequent force threshold based on a subsequent touch position and based on the function;

determine, after determining that the force applied to the touch surface does not satisfy the force threshold and after determining the subsequent force threshold, that the increased force satisfies the subsequent force threshold; and output, after determining that the force applied to the touch surface does not satisfy the force threshold and after determining that the increased force satisfies the subsequent force threshold, touch position information for further processing.

16. The device of claim 15, wherein the force threshold comprises a value in a range of 0.03 to 0.07 N.

17. The device of claim 15, wherein the touch surface has a circumferential edge.

18. The device of claim 17, wherein, when outputting the touch position information, the one or more processing units are to:
   determine that the subsequent touch position is within a particular distance to the circumferential edge, and
   output the touch position information for further processing based on determining that the subsequent touch position is within the particular distance to the circumferential edge.

19. The device of claim 18, wherein the particular distance comprises a value in a range of 2 to 10 mm.

20. The device of claim 15, wherein the one or more processing units are further to:
   determine that a particular duration has elapsed; and
   discard the touch position information based on determining that the particular duration has elapsed.

* * * * *